United States Patent [19]
Polzin et al.

[11] Patent Number: 4,965,793
[45] Date of Patent: Oct. 23, 1990

[54] METHOD AND APPARATUS FOR INTERFACING A SYSTEM CONTROL UNIT FOR A MULTI-PROCESSOR

[75] Inventors: R. Stephen Polzin, Holden; Roger G. Niles, Marlboro; Rueysen Lin, Lexington, all of Mass.

[73] Assignee: Digital Equipment Corporation, Maynard, Mass.

[21] Appl. No.: 306,862

[22] Filed: Feb. 3, 1989

[51] Int. Cl.$^5$ .............................................. H04J 3/24
[52] U.S. Cl. .................................. 370/94.1; 370/85.9
[58] Field of Search ....................... 370/60, 94, 61, 85, 370/85.1, 85.9, 85.11, 94.1, 94.2; 340/825.5, 825.51; 375/109, 118; 364/200, 900

[56] References Cited

U.S. PATENT DOCUMENTS

| | | | |
|---|---|---|---|
| 4,392,200 | 7/1983 | Arulpragasam | 340/200 |
| 4,449,182 | 5/1984 | Rubinson et al. | 364/200 |
| 4,500,958 | 2/1985 | Manton et al. | 364/200 |
| 4,521,882 | 6/1985 | Gabrielli et al. | 370/94 |
| 4,543,626 | 9/1985 | Bean et al. | 364/200 |
| 4,543,628 | 9/1985 | Pomfret | 364/200 |
| 4,554,673 | 11/1985 | Stevens | 375/118 |
| 4,667,287 | 5/1987 | Allen et al. | 364/200 |
| 4,730,308 | 3/1988 | Friedman et al. | 370/94 |
| 4,740,958 | 4/1988 | Duxbury et al. | 370/94 |
| 4,779,267 | 10/1988 | Limb | 370/94 |
| 4,799,215 | 1/1989 | Suzuki | 370/94 |
| 4,823,312 | 4/1989 | Michael et al. | 370/94 |

OTHER PUBLICATIONS

Fossum et al., "An Overview of the VAX 8600 System," Digital Technical Journal, No. 1, Aug. 1985, pp. 8-23.

Primary Examiner—Douglas W. Olms
Assistant Examiner—Alpus H. Hsu
Attorney, Agent, or Firm—Arnold, White & Durkee

[57] ABSTRACT

To interface a system control unit with an input/unit in a computer system, an interface includes a transmitter for sequentially transmitting data packets and parity signals between the system control unit and the input/output unit, and a receiver for sequentially receiving the data packets and parity signals. The receiver includes a buffer for storing a plurality of the data packets. The stored data packets are controllably unloaded from the buffer, and a buffer emptied signal is sent back to the transmitter as each data packet is unloaded. The transmitter has a counter which calculates the number of data packets stored in the buffer and asserts a signal that prevents the transmitter from transmitting additional data packets when the buffer becomes full. The receiver compares the parity of the received data packets to the respective parity signals to check for parity errors. The receiver sends an acknowledge signal back to the transmitter in the absence of a parity error, and sends a retry signal back to the transmitter in the presence of a parity error. Preferably the data packets are transmitted along with a separate transmitter clock signal and respective command available signals, and the returned signals are sent back to the transmitter with a separate receiver clock signal, to permit synchronous reception of the data packets or returned signals. Respective data synchronizers in the transmitter and receiver eliminate the effect of skew between the transmitter and receiver clock signals.

16 Claims, 9 Drawing Sheets

METHOD AND APPARATUS FOR INTERFACING A SYSTEM CONTROL UNIT FOR A MULTI-PROCESSOR

RELATED APPLICATIONS

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, U.S. Ser. No. 07/306,325,filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, U.S. Ser. No. 07/306,837, filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, U.S. Ser. No. 07/306,326, filed Feb. 3, 1989; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, U.S. Ser. No. 07/306,767, filed Feb 3, 1989; D. Fite et al., DECODING MULTIPLE SPECIFIERS IN A VARIABLE LENGTH INSTRUCTION ARCHITECTURE, U.S. Ser. No. 07/306,347, filed Feb. 3, 1989; D. Fite et al., VIRTUAL INSTRUCTION CACHE REFILL ALGORITHM, U.S. Ser. No. 07/306,831, filed Feb. 3, 1989; Herman et al., PIPELINE PROCESSING OF REGISTER AND REGISTER MODIFYING SPECIFIERS WITHIN THE SAME INSTRUCTION, U.S. Ser. No. 07/306,833, filed Feb. 3, 1989; Murray et al., MULTIPLE INSTRUCTION PREPROCESSING SYSTEM WITH DATA DEPENDENCY RESOLUTION FOR DIGITAL COMPUTERS, U.S. Ser. No. 07/306,773, filed Feb 3, 1989; D. Fite et al., PREPROCESSING IMPLIED SPECIFIERS IN A PIPELINED PROCESSOR, U.S. Ser. No. 07/306,846, filed Feb. 3, 1989; D. Fite et al., BRANCH PREDICTION, U.S. Ser. No. 07,306,760, filed Feb. 3, 1989; Fossum et al., PIPELINED FLOATING POINT ADDER FOR DIGITAL COMPUTER, U.S. Ser. No. 07/306,343, filed Feb. 3, 1989; Grundmann et al., SELF TIMED REGISTER FILE, U.S. Ser. No. 07/306,445, filed Feb. 3, 1989; Beaven et al., METHOD AND APPARATUS FOR DETECTING AND CORRECTING ERRORS IN A PIPLINED COMPUTER SYSTEM, U.S. Ser. No. 07/306,828, filed Feb. 3, 1989; Flynn et al., METHOD AND MEANS FOR ARBITRATING COMMUNICATION REQUESTS USING A SYSTEM CONTROL UNIT IN A MULTI-PROCESSOR SYSTEM, U.S. Ser. No. 07/306,871, filed Feb. 3, 1989; E. Fite et al., CONTROL OF MULTIPLE FUNCTION UNITS WITH PARALLEL OPERATION IN A MICROCDED EXECUTION UNIT, U.S. Ser. No. 07/306,832, filed Feb. 3, 1989; Webb, Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, U.S. Ser. No. 07,306,866 filed Feb. 3, 1989; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, U.S. Ser. No. 07/306,544, filed Feb. 3, 1989; Hetherinton et al., WRITE BACK BUFFER WITH ERROR CORRECTING CAPABILITIES, U.S. Ser. No. 07/306,703, filed Feb. 3, 1989; Flynn et al., METHOD AND MEANS FOR ARBITRATING COMMUNICATION REQUESTS USING A SYSTEM CONTROL UNIT IN A MULTI-PROCESSOR SYSTEM, U.S. Ser. No. 07/306,871, filed Feb. 3, 1989; Chinnasway et al., MODULAR CROSSBAR INTERCONNECTION NETWORK FOR DATA TRANSACTIONS BETWEEN SYSTEM UNITS IN A MULTI-PROCESSOR SYSTEM, U.S. Ser. No. 07,306,336, filed Feb. 3, 1989; Gagliardo et al., MEMORY CONFIGURATION FOR USE WITH MEANS FOR INTERFACING A SYSTEM CONTROL UNIT FOR A MULTIPROCESSOR SYSTEM WITH THE SYSTEM MAIN MEMORY, U.S. Ser. No. 07/306,404, filed Feb. 3, 1989; and Gagliardo et al., METHOD AND MEANS FOR ERROR CHECKING OF DRAM-CONTROL SIGNALS BETWEEN SYSTEM MODULES, U.S. Ser. No. 07/306,836, filed Feb. 3, 1989.

TECHNICAL FIELD

This invention relates generally to an interface between functional components of a computer system and, more particularly, to an interface between a system control unit of a multi-processor computer system and its associated input/output (I/O) devices.

DESCRIPTION OF RELATED ART

In the field of computer systems, it is not unusual for a system to include a plurality of central processing units (CPUs) operating in parallel to enhance the system's speed of operation. Typically, each of the CPUs operate on a particular aspect of a single computer program and will, therefore, require access to the same program and variables stored in memory. It can be seen that each of the CPUs requires access to a shared common main memory, as well as, input/output units (I/O). The I/O allows the computer system, in general, and the CPUs, in particular, to communicate with the external world. For example, the I/O includes such well known devices as disc and tape drives, communication devices, printers, plotters, workstations, etc.

This parallel operation presents some problems in the form of access conflicts to the shared memory and I/O. A system control unit (SCU) is employed to manage these inter-unit communications. The SCU links the CPUs to the main memory and to the I/O through a series of independent interfaces. Data requests are received by the SCU from each of the units which, owing to the parallel nature of the CPU operation, occur at unscheduled times, and in particular, at the same time. These requests for data transfer are scheduled according to an arbitration algorithm and processed through the appropriate interface to/from the identified unit.

Efficient communication between all system units ported into the SCU is critical to optimize parallel operation of the computer system. The speed of the interfaces is important to the overall operation of the computer system to ensure that a bottleneck of data does not develop. There is little point in individual units being able to operate at high speed if they must continually wait for data from other units.

While the designers of such computer systems typically have control over the interfaces between each of the system units and can develop an interface capable of operating at the desired speed, this is not entirely true of the SCU to I/O interface. Rather, I/O devices are ordinarily of a standard design and construction, and in fact, are quite often purchased as off-the-shelf units from other manufacturers. Accordingly, the interface designer is constrained by the physical implementation of the I/O units. For example, one of the most significant design limitations is the physical number of communication lines. The limited number of communication lines has a direct impact on the speed at which data can be transferred.

There are two methods to realize a desired rate of transfer. First, the width of the parallel interface can be increased to simply send more data during each clock cycle. However, in the instant case the designer has no control over the width of the interface since he is limited to the number of communication lines provided by the I/O unit. The second method involves increasing the speed of the clock so that more transfers can occur within the same duration of time. Of course, there are limitations as to how far the clock signal can be increased. There is a speed at which the hardware is simply incapable of operating.

Further exacerbating this design limitation is the physical location of the I/O units. The I/O units are typically located remote from the SCU. The cable interconnecting the two units is subject to a harsh electromagnetic environment as it traverses multiple cabinets, each having a unique relative ground potential. Additionally, the high frequency clock system also contributes to electromagnetic interference. To contend with these noise problems and provide for data integrity, the interface typically employs noise reduction methods, such as differential communication. Unfortunately, these noise reduction methods further reduce the number of communication lines.

Although noise immunity is improved by these methods, an occasional error will still occur. Therefore, some method of recognizing and communicating these errors must be provided. Accordingly, the limited number of communication lines is further reduced by the need for error communication.

Traditionally, communication within a computing system is confined to relatively short distances (less than six feet). Accordingly, synchronous, parallel communication schemes are generally employed. This method of communication yields high bandwidths for the given technology and available number of wires. The length of interconnecting cables is usually limited by the system clock skew versus the propagation delay of the data path.

Intermediate distance communication (less than 20 feet) is typically accomplished using a simple asynchronous parallel communication scheme. This method generally yields much longer transmission distances for a given technology and available number of wires, but with significantly lower bandwidths. Data transfer is commonly signaled with asynchronous strobe signals and the corresponding handshaking signals.

Longer distance communication (greater than 20 feet) is generally accomplished with asynchronous, multidrop serial busses. Ethernet is exemplary of such a communication scheme.

SUMMARY OF THE INVENTION

To interface a system control unit with an I/O unit in a computer system, an interface includes means for sequentially transmitting data packets and parity signals between the system control unit and the input/output unit, and means for sequentially receiving the data packets and parity signals. The receiving means includes a buffer means for sequentially storing a plurality of the data packets. The stored data packets are controllably unloaded from the buffer means, and a buffer emptied signal is sent back to the transmitting means as each data packet is unloaded. The transmitting means has a counter which calculates the number of data packets stored in the buffer means and asserts a signal that prevents the transmitting means from transmitting additional data packets when the buffer means becomes full. The receiving means compares the parity of the received data packets to the respective parity signals to check for parity errors. The receiving means sends an acknowledge signal back to the transmitting means in the absence of a parity error, and sends a retry signal back to the transmitting means in the presence of a parity error. Preferably the data packets are transmitted along with a separate transmitter clock signal and respective command available signals, and the returned signals are sent back to the transmitting means with a separate receiver clock signals, to permit synchronous reception of the data packets or returned signals. Respective data synchronizers in the transmitting means and receiving means eliminate the effect of skew between the transmitter and receiver clock signals.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 1:
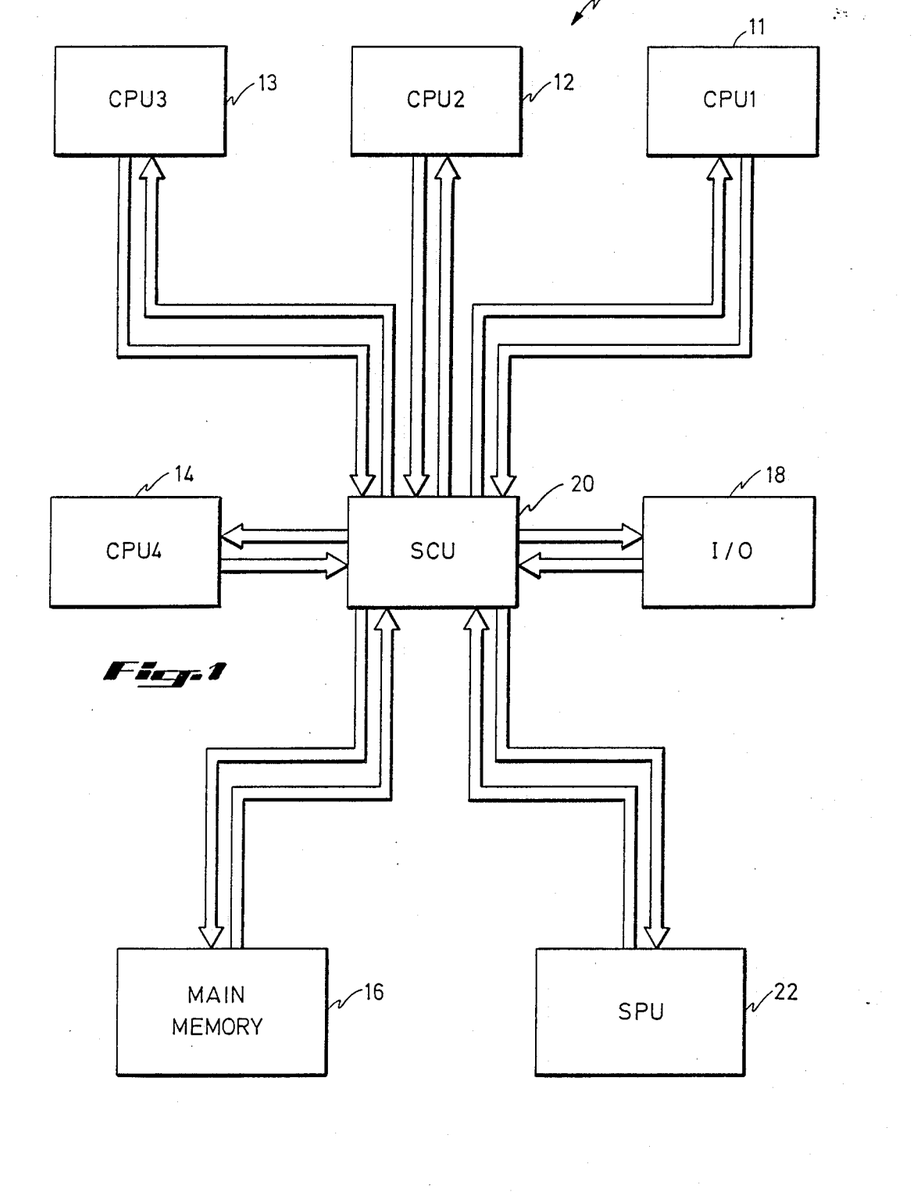
FIG. 1 is a block diagram of a computer system.

Turning now to the drawings and referring first to FIG. 1, there is shown a block diagram of a multiprocessor computer system 10 which includes a plurality of central processing units (CPU1-CPU4) 11, 12, 13, 14. The CPUs require access to a shared common main memory 16, as well as, input/output units (I/O) 18. The I/O 18 allows the computer system 10, in general, and the CPUs, in particular, to communicate with the external world. For example, the I/O 18 includes such well known devices as disc and tape drives, communication devices, printers, plotters, workstations, etc.

To take full advantage of the multiple CPUs, the system is configured to allow CPU1-CPU4 to operate in parallel. This parallel operation presents some problems in the form of access conflicts to the shared memory 16 and I/O 18. A system control unit (SCU) 20 is employed to manage these inter-unit communications. The SCU 20 links CPU1-CPU4 to the main memory 16 and to the I/O 18 through a series of independent interfaces. Data requests are received by the SCU 20 from each of the units which, owing to the parallel nature of the CPU operation, occur at unscheduled times, and in particular, at the same time. These requests for data transfer are scheduled according to an arbitration algorithm and processed through the appropriate interface to/from the identified unit.

The SCU 20 also links the various system units to a service processor unit (SPU) 22 which performs traditional console functions including status determination and the control of the overall operation of the processing system. In particular, the SCU 20 provides the SPU 22 with means for communicating with the plurality of CPUs and provides access to all storage elements within the CPUs.

Efficient communication between all system units ported into the SCU 20 is critical to optimize parallel operation of the computer system 10. While the designer of such computer systems 10 typically has control over the interfaces between each of the system units, this is not entirely true of the SCU to I/O interface. Rather, I/O devices are ordinarily of a standard design and construction, and in fact, are quite often purchased as off-the-shelf units from other manufacturers. Accordingly, the interface designer is constrained by the physical implementation of the I/O units. For example, one of the most significant design limitations is the physical number of communication lines. In the present case the I/O devices are limited to 120 communication lines.

Further exacerbating this design limitation is the physical location of the I/O units. The I/O units are typically located remote from the SCU 20 and can be up to twelve feet distant. The cable interconnecting the two units is subject to a harsh electromagnetic environment as it traverses multiple cabinets, each having a unique relative ground potential. Additionally, the high frequency clock system (e.g. 500 MHz) also contributes to electromagnetic interference. To contend with these noise problems and provide for data integrity, the interface employs differential, series terminated ECL level signals. It should be noted that the use of series terminated ECL precludes the use of a single wire from communicating in two directions. That is, series terminated ECL allows signals to travel in only one direction on each wire. Thus, in order to transmit signals in both directions, twice as many lines are required.

Unfortunately, these two methods of ensuring data integrity each reduce the number of communication lines by one-half. Accordingly, to provide a sufficient level of noise immunity, the number of communication lines is reduced from 120 to 30.

Although noise immunity is improved by these two methods, an occasional error will still occur. Therefore, some method of recognizing and correcting these errors must be provided. Accordingly, parity signals are delivered along with the data. Further, in the event of a parity error provision must be had for communicating the error back to the transmitter to allow the data to be communicated a second time. Thus, it can be seen that the limited number of communication lines is further reduced by the need for parity and some form of handshaking.

Finally, owing to the great distance (12 feet) separating the SCU 20 and I/O 18, the signals transmitted over the interface will experience a significant delay (e.g. 20 nsec for a 12 foot interface cable). This skewing of the transmitted data results in synchronization problems between the remote units. To solve this synchronization problem, the remote units each operate using an independent asynchronous clock signal and transmit their clock signal along with their data to the other remote unit. In this manner the clock signal and the data will be similarly affected by the transmission delay, so that using the delayed clock signal to enable the receiver latches eliminates the synchronization problem. Transmitting the clock signals does, however, further reduce the number of communication lines available for data transfer.

It should be appreciated that the present invention, though limited by 12 feet of cable and having only 120 transmission lines, has a raw communication speed of 125 megabytes/sec in each direction. Further, approximately 80 to 100 megabytes/sec of this raw speed consists of usable data. Moreover, it is also of interest to note that the clock cycle time is less than the cable delay (16 nsec versus 20 nsec). Accordingly, this means that two cycles of data are present on the twelve foot interface cable simultaneously.

Further, the length of the interface cable is restricted according to the following formula:

$$\text{LENGTH} = \frac{T_{CYC} + T_{HLD} + T_{SU} - T_{SKI}}{T_{SKC}}$$

where:

LENGTH = cable length in inches;
$T_{CYC}$ = cycle time in picoseconds;
$T_{HLD}$ = Hold time of the receive flip flop;
$T_{SU}$ = Set up time of the receive flip flop;
$T_{SKI}$ = Intrinsic skew of transmitter and receiver etch and $SiO_2$ in picoseconds;
$T_{SKC}$ = Skew contribution of cable in picoseconds/inch.

Figure 2:
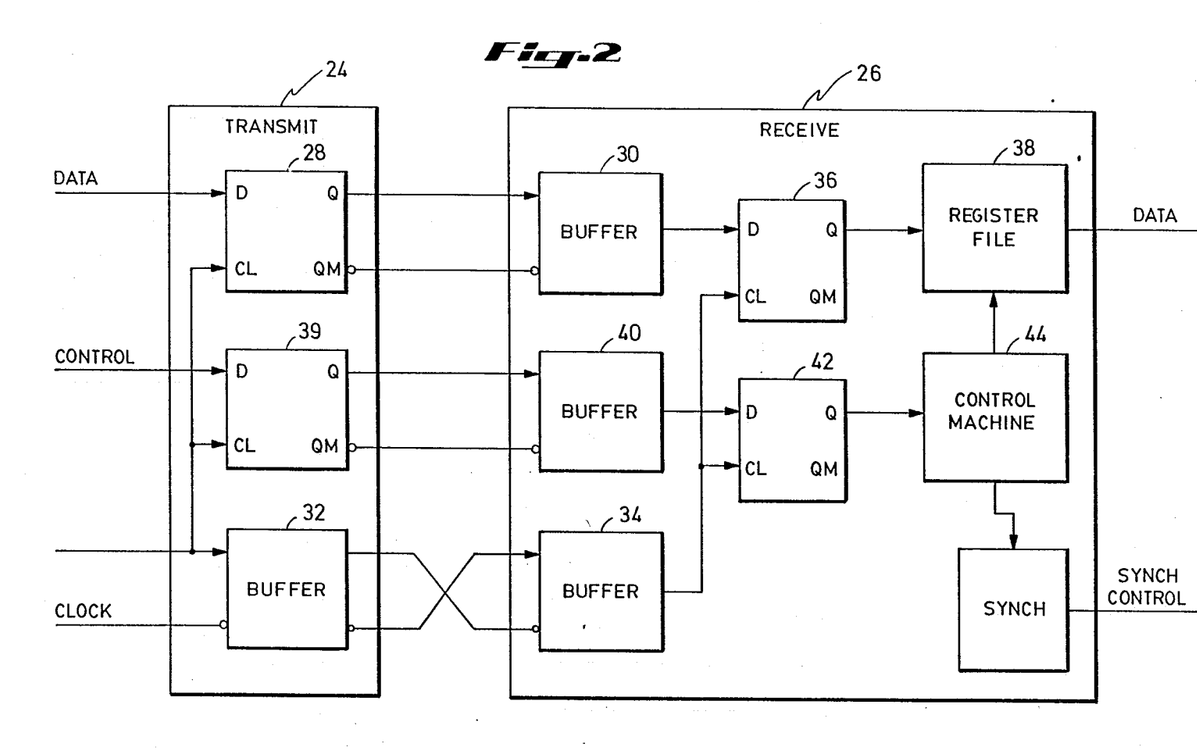
FIG. 2 is a diagram of a SCU - I/O interface in the computer system of FIG. 1.

FIG. 2 illustrates a general block diagram of the SCU to I/O interface. It should be recognized that while only a single transmitter 24 and receiver 26 are illustrated, both the SCU and the I/O include a transmitter and receiver to facilitate data transfer in each direction. Data contained in a D type flip flop 28 is delivered from the transmitter 24 over differential lines to a buffer 30 in the receiver 26. The clock signal for the flip flop 28 is provided by a source clock signal generated within the transmitter 24. To synchronize the transmitted data with the receiver hardware, the source clock signal is delivered from a buffer 32 over differential lines to a buffer 34 in the receiver 26. The receiver buffer 26, in turn, delivers the clock signal to the clock input of a D type flip flop 36 in the receiver 26. While only a single set of flip flops 28, 36 and buffer 30 is illustrated, an additional seventeen of such sets are operated in parallel to allow the simultaneous transfer of a 2-byte word with 2-bit parity. The eighteen parallel flip flops 36 all deliver their outputs to a register file 38 where the data is maintained until the receiver specific logic acts to unload the register file and use the transmitted data.

Handshaking between the two remote units is illustrated as initiating in the transmitter 24 from a source control with the actual signal being maintained in a D type flip flop 39. The transmitter clock signal is delivered to the clock input of the flip flop 39. Differential signals are delivered from the flip flop 39 to a buffer 40 in the receiver 26. The buffer 40 delivers the handshaking signal to a D type flip flop 42 which has its clock input connected to the buffer 34. The output of the flip flop 42 is connected to a control machine 44 which, in turn, passes signals to the register file 38. In this simplified block diagram the handshaking signals have been reduced to a single set of differential lines communicating from the transmitter 24 to the receiver 26; however, the actual specific implementation includes four handshaking lines communicating in both directions. This specific implementation of the handshaking signals is discussed in greater detail in conjunction with the remaining specification. At this time it is sufficient to realize that the control 44 responds to the handshaking signals to validate/invalidate the data contained in the register file 38 and to initiate a retry on erroneous data.

Figure 3:
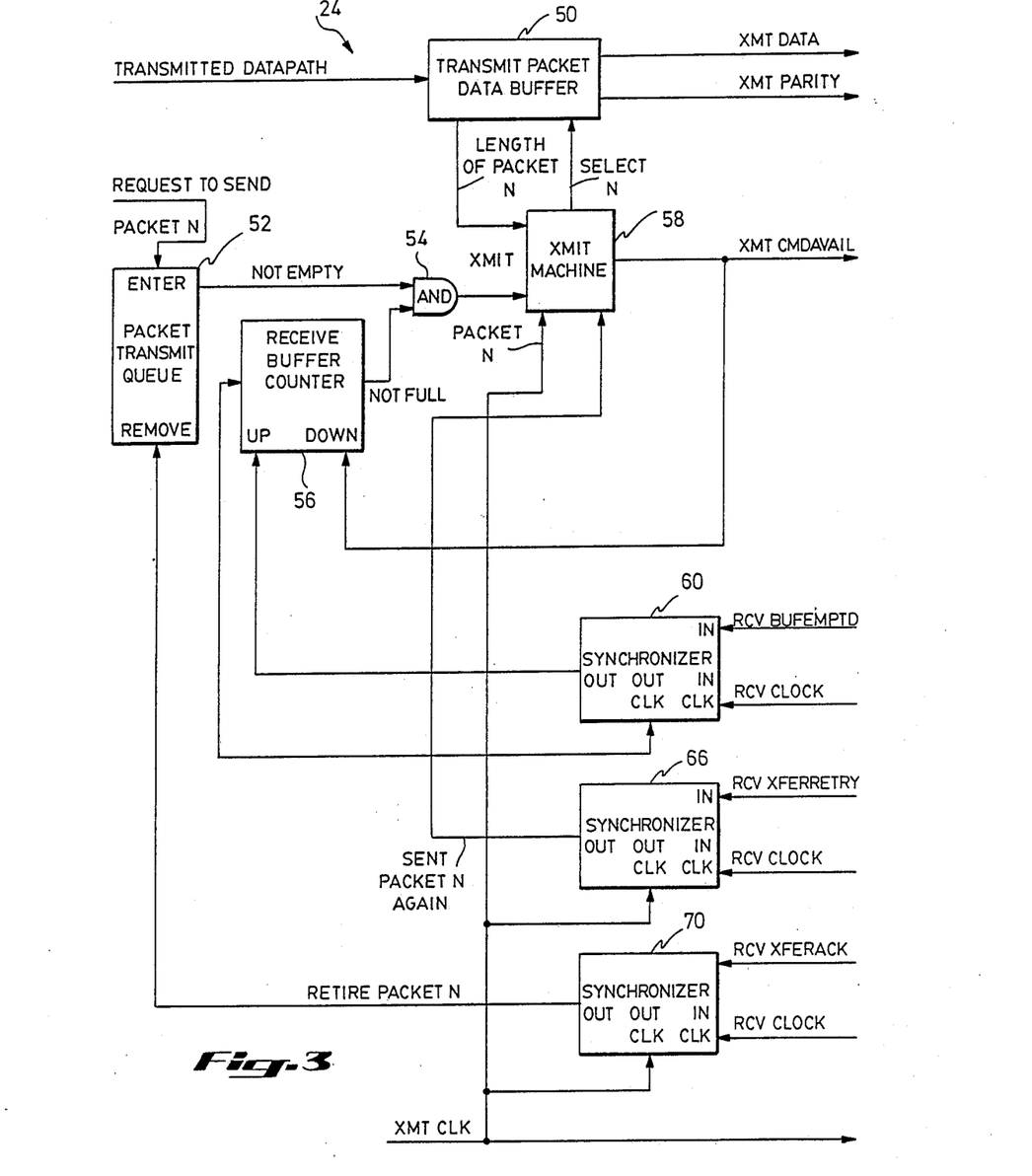
FIG. 3 is a block diagram of transmitter control logic in the SCU - I/O interface.
Figure 4:
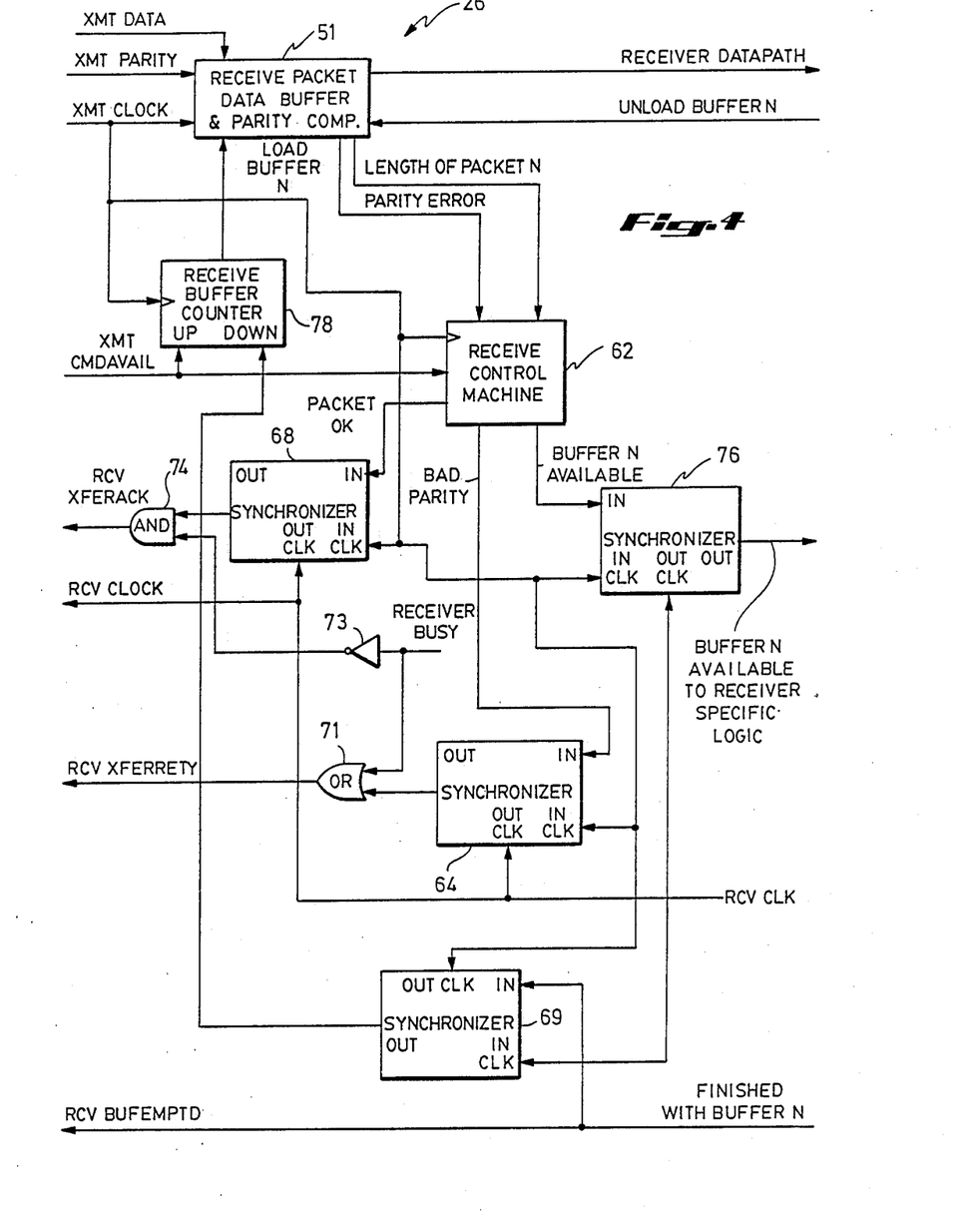
FIG. 4 is a block diagram of the receiver control logic in the SCU - I/O interface.

Referring now simultaneously to FIGS. 3 and 4, there are shown detailed block diagrams of the transmitter and receiver control architecture, respectively. In view of the considerable interaction between the transmitter 24 and receiver 26, it is convenient to discuss the operation of each in light of the operation of the other. Accordingly, the discussion of FIGS. 3 and 4 should logically follow the flow of data and control signals between the two units.

The data to be transmitted is provided by that unit which desires to send data to the other unit and is placed in the transmit packet data buffer 50. It is understood that either the I/O 18 or the SCU 20 can initiate data transfers in either direction; however, for ease of explanation it will be assumed here that the SCU 20 is sending data to the I/O 18. Accordingly, the SCU 20 places the packet of data in the buffer 50. The buffer 50 includes multiple storage locations separately identifiable with distinct packets of data. In other words, the buffer 50 actually consists of multiple buffers with an insert and remove pointer employed to store and access data at selected locations. Further, a packet of data consists of an indeterminate number of two-byte words. This is not to say that the length of the packet is unknown, merely that it may take on any desired length within a range of acceptable lengths. Bits four and five of the first two-byte word of data in the packet are encoded to contain information on the length of the packet. Similarly, the receiver 26 includes a receive packet data buffer 51 similar in construction and number of buffers.

At the same time, a request to send the packet is delivered by the SCU 20 to a packet transmit queue 52. Like the buffer 50, the queue 52 contains multiple storage locations with each queue storage location corresponding to one of the multiple buffers in the buffer 50. In this manner the queue 52 becomes a type of flag indicating to the transmitter 24, which of the buffers 50 contains data to be sent to the transmitter. Thus, the output of the queue 52 ultimately controls the delivery of data. As long as the queue 52 contains a request to send a packet, a "not empty" signal is delivered to enable the buffer 50 to send the designated packet. The "not empty" signal is delivered to the input of an AND gate 54, thereby enabling the AND gate 54 to pass a signal from a receiver buffer counter 56.

The receiver buffer counter 56 forms a portion of a means for the transmitter 24 to keep track of whether the receive packet data buffer 51 is full or not. This arrangement enhances the interface transfer speed. For example, the alternative approach is to allow the receiver 26 to signal the transmitter 24 every time it is ready to receive a packet of data. Thus, the transmitter 26 must always wait before sending a packet of data. When one considers that the transmission time is significant (20 Nsec with only a 16 Nsec clock cycle), the delays become cumulative and performance of the interface is drastically reduced. However, in the instant implementation, the transmitter 24 "knows" whether the receiver buffer 51 is full and does not need to wait. Rather, the transmitter 24 can continue to send packets with no delay.

The receiver buffer counter 56 includes an increment and a decrement input. The decrement input is connected to the output of a transmit state machine 58, and in particular, to a transmit command available signal (XMT CMDAVAIL). The state machine 58 ultimately determines when the packet of data is sent and precedes the data with the XMT CMDAVAIL signal delivered to the receiver 26 and the counter 56. The counter 56 is initially set to a value equal to the number of buffers within the receive buffer 51. Thus, as each packet of data is transmitted to the receiver 26 the XMT CMDAVAIL signal decrements the counter 56 to indicate one less buffer is available. As long as the counter is not zero, the counter 56 supplies an enable signal through the AND gate 54 to the transmit state machine 58.

It should be realized that the transmitter 24 and receiver 26 operate autonomously, such that, while the transmitter 24 is sending data to the receiver 26, the receiver 26 is unloading that data from the buffer and freeing those buffers to receive additional packets of data. As the receiver 26 retires data from the buffer 51, a receiver buffer emptied signal (RCV BUFEMPTD) is delivered to the transmitter 24. This signal is synchronized with the transmitter clock via the synchronizer 60 and then delivered to the increment input of the receiver buffer counter 56. Therefore, as each receive buffer 51 is freed to receive additional data, the counter is incremented to indicate that an additional buffer is available. Thus, while the counter 56 is nonzero, the transmitter 24 continues to output packets of data without delay.

The transmit state machine 58 also receives inputs from the transmit buffer 50 indicating the length of the packet. As discussed previously, bits 4 and 5 of the first two-byte word are encoded to indicate the length and are delivered to the transmit state machine 58. The state machine needs to "know" the length of the packet in order to "know" when to send the next packet of data. For example, four clock cycles are required to send an eight-byte packet. A two-byte word is sent during each clock cycle. Thus, by "knowing" that the packet requires four cycles, the state machine 58 can prepare to send the next packet on the fifth clock cycle.

To initiate the transfer of data, the state machine 58 delivers the XMT CMDAVAIL during the first clock cycle along with a select signal to the appropriate buffer of the transmit buffer 50. Thereafter, the transmit buffer 50 consecutively delivers each two-byte word over the sixteen-bit wide data interface. The receive buffer 51 receives each two-byte word and stores them in consecutive locations within a selected buffer. At the same time, the parity and transmit clock signals are also delivered over the interface. The transmit clock signal enables the receive buffer 51 to synchronize the transmit data with the receive buffer 51. The parity of the received data is compared to the transmitted parity signals and any errors in parity are communicated to a receive state machine 62. A parity error ultimately results in the entire packet being retransmitted over the interface.

A parity error detected by the receive buffer 51 is communicated to the receive state machine 62, which returns the signal to the transmitter 24 to initiate a retry on that packet of data. The bad parity signal from the state machine 62 is synchronized with the receive clock via synchronizer 64 and delivered to the transmitter 24 as a receive transfer retry signal (RCV XFERRETRY). A transmitter synchronizer 66 receives RCV XFERRETRY, synchronizes it with the transmitter clock, and delivers the signal to the transmit state machine 58. The state machine 58 responds by delivering XMT CMDAVAIL to the receiver and the buffer select signal to the same buffer as previously accessed. At the beginning of the next clock cycle the transmit buffer 50 begins transmitting the packet of data again.

Alternatively, if no parity error is detected, then the receiver 26 responds with a receive transfer acknowledge signal (RCV XFERACK) to indicate that the packet has been properly received and the transmitter 24 may safely remove that data transfer request from the queue 52. The receive state machine 62 receives a signal from the receive buffer 51 indicative of the length of the packet being transferred. As discussed previously, bits four and five of the first two-byte word are indicative of the packet length. These two bits are delivered to the state machine, 62, so that at the end of the appropriate number of clock cycles, the transfer acknowledge signal is delivered. The signal is synchronized with the receive clock via synchronizer 68 and passed to the transmitter 24. A transmitter synchronizer 70 receives RCV XFERACK, synchronizes it with the transmit clock, and passes the signal to the packet transmit queue 52. In the queue 52, a valid bit is reset for that buffer and the remove pointer is incremented to indicate the next address.

It should be noted that RCV XFERRETRY can also be initiated by the receiver specific logic. An OR gate 72 receives inputs from the synchronizer 62 and a receiver busy signal from the receiver specific logic. Thus, if for any reason the receiver unit (in this example, one of the I/O units) is unable or unwilling to receive the transmitted packet, it need only assert the receiver busy signal to generate RCV XFERRETRY. Further, it is desirable to block RCV XFERACK to prevent the receiver 26 from acknowledging the packet when the receiver busy signal is asserted. Thus, an AND gate 74 receives RCV XFERACK from the state machine 62 as one input. The second input to the AND gate 74 is the inverted receiver busy signal. Therefore, when the receiver busy signal is asserted, the AND gate 74 is not enabled to pass RCV XFERACK.

The state machine 62 also provides a buffer available signal to the receiver specific logic to indicate when a packet receive is complete and in which buffer it is available. A synchronizer 76 synchronizes the buffer available signal with the receiver clock and passes that signal to the receiver specific logic. Thereafter, the receiver specific logic initiates an unload buffer signal to the receive buffer 51. The unload signal causes the buffer 51 to deliver the data contained in the designated buffer to the receiver specific logic.

Loading of the receive buffer 51 is controlled by a receive buffer counter 78. The counter 78 is configured to count between zero and the number of buffers in the receive buffer 51, such that, the output of the counter 78 acts as an insert pointer to the receive buffer 51. The increment input of the counter 78 receives its control signal from the XMT CMDAVAIL. Conversely, the decrement input of the counter 78 receives its control signal from the receiver specific logic. When the receiver specific logic has successfully unloaded a buffer in the receive buffer 51, it generates a receive buffer emptied signal (RCV BUFEMPTD). This signal indicates that one of the buffers has been successfully unloaded and is now available to receive a new packet of data. As discussed previously, this same signal is supplied to the decrement input of the transmitter's receiver buffer counter 56. Accordingly, the counter 78 points to the next available buffer in the receive buffer 51.

Figure 5:
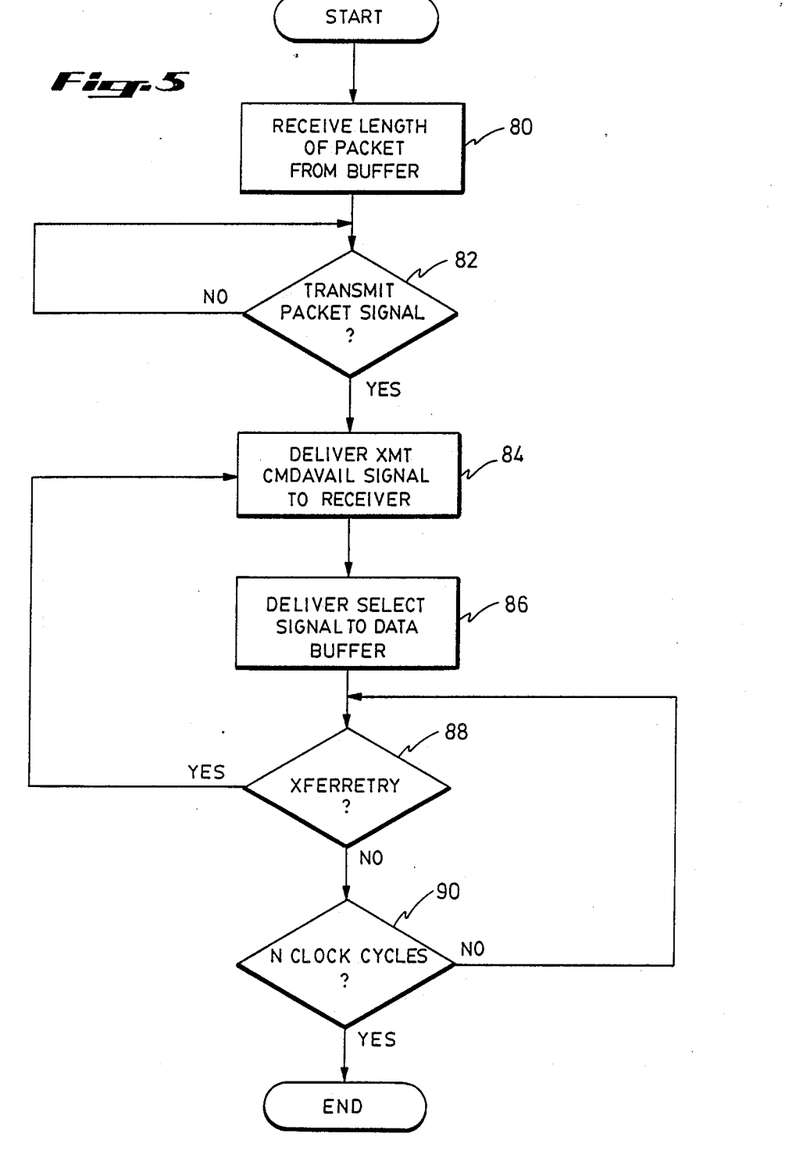
FIG. 5 is a flowchart representation of the control scheme followed by a transmit state machine in the transmitter control logic of FIG. 3.
Figure 6:
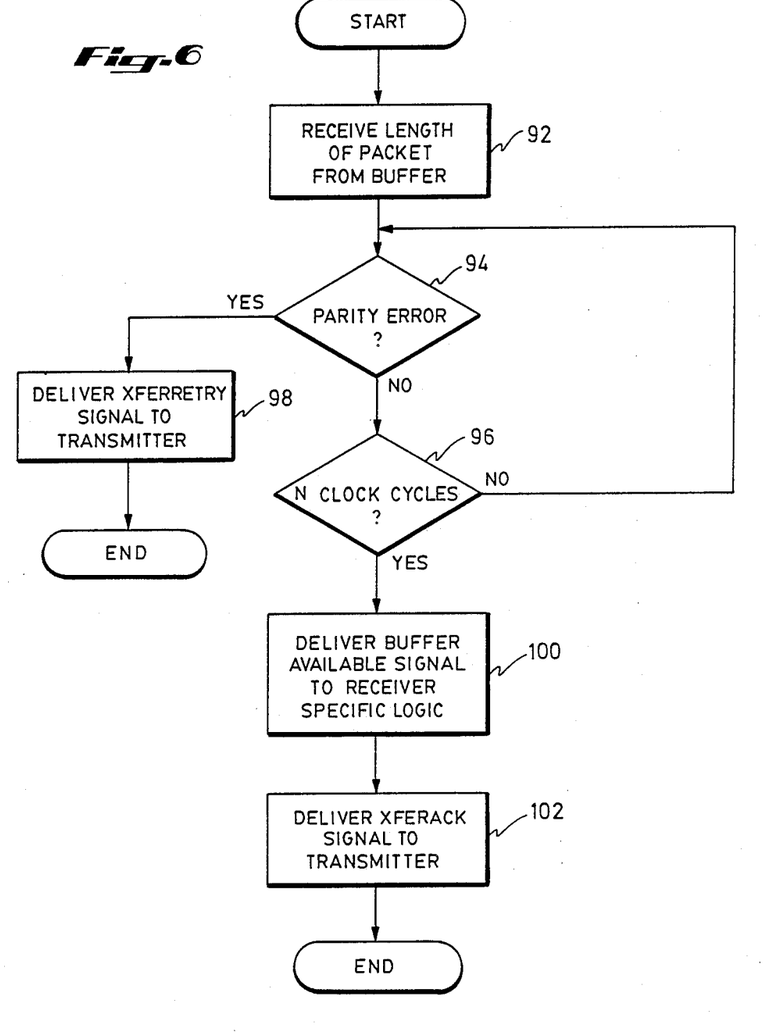
FIG. 6 is a flowchart representation of the control scheme followed by a receive state machine in the receiver control logic of FIG. 4.

Operation of the transmit and receive state machines 58, 62 can best be described in conjunction with a pair of functional flow charts illustrated in FIGS. 5 and 6. Referring now to FIG. 5, wherein the transmit state machine 58 functional flow chart is illustrated, control begins at block 80 with the state machine 58 receiving the length of the packet from the transmit buffer 50. The length of the packet is significant in determining when the packet transfer is complete. For example, a packet that contains four two-byte words is finished transmitting at the beginning of the sixth clock cycle (one clock cycle for the XMT CMDAVAIL and one clock cycle for each two-byte word).

Thereafter, the state machine 58 awaits the transmit packet signal from the AND gate 54. The absence of this signal indicates that either the receive buffer 51 is full or there is no data present in the transmit buffer 50 to be sent. Decision block 82 represents this portion of the state machine 58. As long as the transmit packet signal is not received, decision block 82 loops back on itself and does not allow control to proceed to the remainder of the function flow chart. Once the transmit packet signal is received, control transfers to block 84 where the actual transfer of data is initiated. The state machine 58 delivers XMT CMDAVAIL to the receiver 26. This signal informs the receiver 26 to begin monitoring the data lines at the next transmit clock signal.

In block 86, the state machine 58 delivers a select signal to the transmit buffer 50. This signal enables the selected buffer to begin unloading data in two-byte words beginning with the next transmit clock signal.

XFERRETRY is monitored during the packet transfer to determine if the receiver 26 has detected any errors in the transmitted data. In decision block 88, an asserted XFERRETRY causes control to return to block 84 where the transfer is attempted again. Otherwise, control passes to decision block 90 which acts to determine if the transfer is complete. Since the state machine knows the length of the packet and, consequently, the number of clock cycles required to transfer the packet, the completion of the transfer is simultaneous with the completion of the required number of clock cycles. Decision block 90 simply counts the number of clock cycles and returns control to decision block 88 if the requisite number of clock cycles has not yet occurred. This looping of control provides for periodic monitoring of the XFERRETRY signal. Upon completing the required number of clock cycles, the state machine 58 is freed to begin the process anew and send another packet of data.

Referring now to FIG. 6, wherein the receive state machine 62 functional flowchart is illustrated, control begins at block 92 with the state machine 62 receiving the length of the packet from the transmit buffer 51. Once again, the length of the packet is significant in determining when the packet transfer is complete.

Control loops through decision blocks 94, 96 as each two-byte word of data is received. In decision block 94 the parity of each byte of data is compared to its corresponding parity bit generated by the transmit buffer 50 and delivered over the interface. As long as no parity errors are detected and all of the data has not been received, decision block 96 transfers control back to decision block 94 to check the parity of the next two-bytes of data. In the event of a parity error, control transfers to block 98 where the state machine 62 initiates XFERRETRY to the transmitter 24.

Alternatively, at the end of the requisite number of clock cycles without a parity error, control transfers to block 100. At this point, the packet transfer is complete and successful. Accordingly, the buffer available signal is delivered to the receiver specific logic. Similarly, in block 102 the state machine 62 initiates XFERACK to the transmitter 24. The control process is complete and the state machine 62 is ready to receive the next packet of data.

Figure 7:
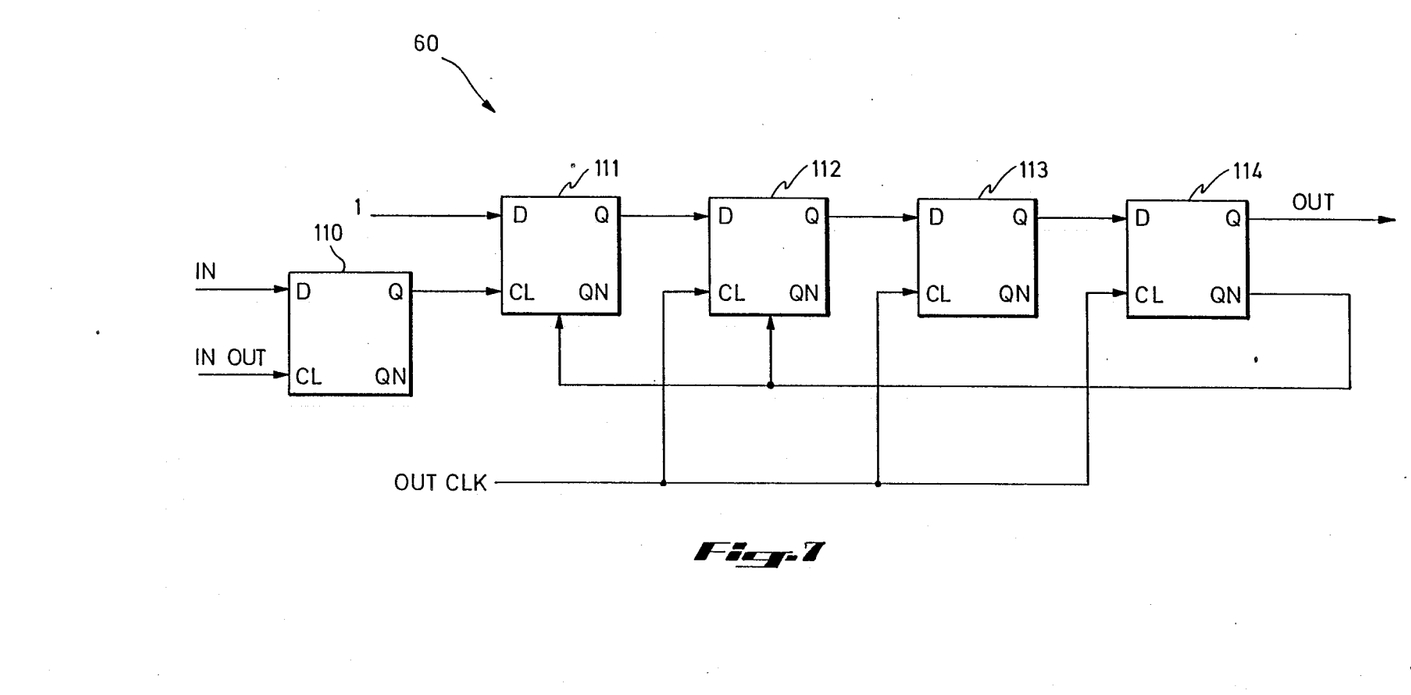
FIG. 7 is a schematic diagram of a transmit or receive clock synchronizer.

Referring now to FIG. 7, a general schematic diagram of the synchronizer 60 is illustrated. The synchronizers 64, 66, 68, 69, 70, 73, 76 have the same construction. The synchronizer 60 includes a series of five D type flip flops 110, 111, 112, 113, 114. The first flip flop 110 receives an input signal at its D input. The input signal is the signal which is to be synchronized with the clock signals. For example, synchronizer 60 (see FIG. 3) receives, as its input, RCV BUFEMPTD which is to be synchronized with the transmit clock signal.

The clock input to the flip flop 110 is the clock signal of the system which is generating the clock signal. For example, the clock input to the synchronizer 60 is RCV CLOCK. This is provided to account for the skewing of the data and clock signals transmitted over the interface. It can be seen that since TCV BUFEMPTD is generated by the receiver 26 using RCV CLOCK and that both signals experience a similar delay from traversing the interface cable, then the value of RCV BUFEMPTD will be stable and valid at the RCV CLOCK transition.

The Q output of the flip flop 110 is connected to the clock input of the flip flop 111. The D input of flip flop 111 is, however, connected to a logically high value. Thus, when the input to flip flop 110 changes states, the flip flop 111 is clocked to pass the high signal through its Q output. The flip flop 111 also has a reset input which is used to set the value of its Q output from logically high to low.

Each of the remaining flip flops 112, 113, 114 has its D input connected to the preceding flip flops Q output and its clock signal connected to the clock signal of the system to which the signal is to be synchronized. For example, the synchronizer 60 has its clock input, XMT CLOCK. The Q output of the final flip flop 114 serves as the output of the synchronizer while the not Q output is connected to the reset inputs of the flip flops 111, 112.

Operation of the synchronizer beings with the input signal being stored in flip flop 110 coincident with the input clock signal. The synchronizer is intended to operate independent of the relative frequencies of the input and output clock signals. However, it should be appreciated that the operation of its internal flip flops are particularly sensitive to concurrent changes in the data and clock signals. Such a concurrent change produces unpredictable results from the flip flops, forcing the flip flops into a metastable state where their output is neither , asserted nor unasserted.

Therefore, in order to avoid ultimately delivering an output from the synchronizer which is metastable, multiple stages of sequential flip flops are employed. Each flip flop stage of the synchronizer is increasing less likely to be forced into a metastable state. Preferably, three stages are employed to give a probability that the final stage will attain a metastable state once in $10^7$ years.

The three stages synchronizer imposes a three cycle delay on all hand shaking signals delivered thereto. Accordingly, hand shaking signals can only be delivered at a rate of one-third of the output clock frequency.

The $Q_{110}$ output of the flip flop 110 is connected to a clock input of a flip flop 111. The D input of the flip flop 111 is connected to a logically high signal. Thus, a high data input and resulting $Q_{110}$ transition from 0 to 1 causes the $Q_{111}$ output to go high. That output is delivered to the first stage flip flop 112 of the three stages 112, 113, 114. The clock inputs to these three stages are controlled by the output clock signal.

Assuming that the data and clock transitions are not concurrent, the high data signal will ripple through the three stages 112, 113, 114 in three output clock cycles and be delivered as an output of the synchronizer. The $QN_{114}$ output of the final stage acts as a feedback signal to the flip flops 111, 112 to indicate that the data signal has been successfully synchronized with the output signal. Thus the flip flops 111, 112 are reset by the low transition of the $QN_{114}$ output in preparation of the next data signal. Flip flop 113 is not reset, so that the output of the synchronizer is at least two clock cycles in width. Since the flip flop 113 is not reset and it should be identical to the flip flop 114, its output will also ripple through the flip flop 114 on the fourth clock cycle.

It can be seen that if the data input to the flip flop 110 is a low value, then the $Q_{110}$ output remains low and does not clock the flip flop 111. Accordingly, since the flip flop 111 was previously reset, its output is low, thereby matching the data input. Like the high data input, this low data input ripples through the three stages of flip flops 112, 113, 114 and is passed as an output of the synchronizer.

Figure 8:
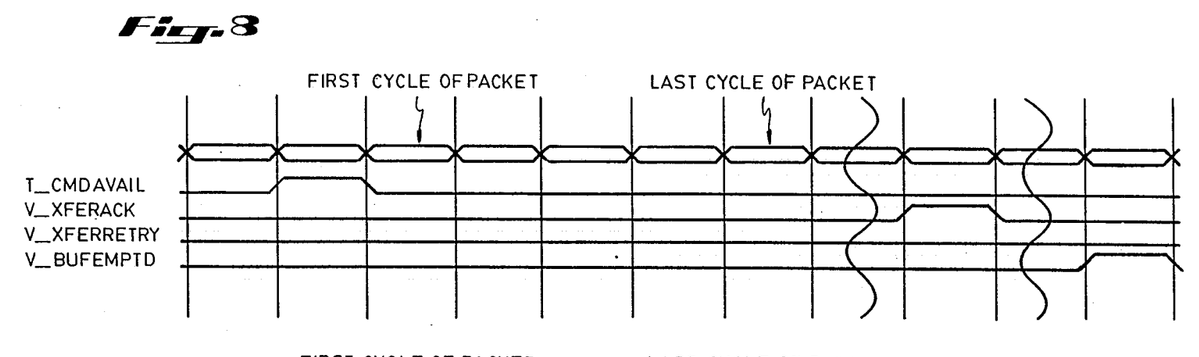
FIG. 8 is a timing diagram of the data and handshaking signals for a single acknowledged data packet transfer.

Operation of the interface may best be described by way of example. Referring now to FIG. 8, the timing diagrams of the data and handshake signals for a simple single acknowledged packet are illustrated. The process begins with the transmit packet data buffer containing a 10-byte packet of data which it desires to send to its matching receiver. Accordingly, the transmit machine 58 delivers a XMT CMDAVAIL signal. The transmit machine 58 then delivers a "select N" signal to the transmit packet data buffer 50. Beginning immediately at the next clock cycle, the transmit packet data buffer 50 begins delivering the packet of data. 2-bytes of data are delivered in each of the five subsequent clock cycles until the transmit packet data buffer is emptied. The received control machine 62 checks for parity errors in the received packet of data and then assuming that the receiver was not busy, the RCV XFERACK signal is delivered to the transmitter. The RCV XFERACK signal is delivered to the packet transmit Queue 52 which removes the original request to send the packet N from the Queue 52. Thereafter, the receiver specific logic will deliver an UNLOAD BUFFER N signal to the receive packet data buffer 51 and remove that packet of data from the buffer 51. Once the buffer 51 is empty, the receiver specific logic delivers a RCV BUFEMPTD signal to the transmitter. The RCV BUFEMPTD signal is used by the transmitter to increment the receive buffer counter 56, indicating that an additional buffer location is available in the receiver.

Figure 9:
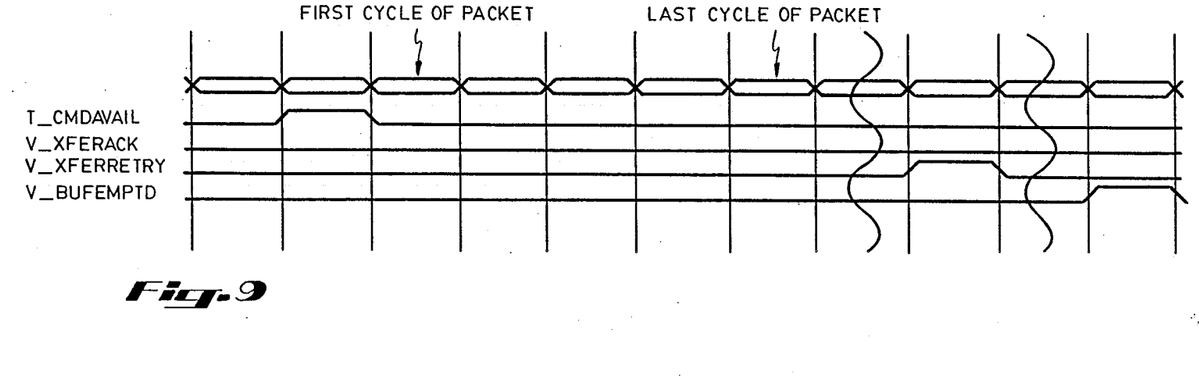
FIG. 9 is a timing diagram of the data and handshaking signals for a single unacknowledged data packet transfer.

Referring now to FIG. 9, the timing diagram for a simple single retried packet is illustrated. Like the simple single acknowledge packet the process begins with the transmitter receiving a request to send packet N into the packet transmit Queue 52. The transmit machine 58 delivers the transmit XMT CMDAVAIL signal and then selects the proper buffer in the transmit packet data buffer 50 from which to immediately begin sending the packet of data. In this case, however, owing either to the receiver being busy or a parity error occurring in the data transmission, the receiver delivers a RCV XFERRETRY signal to the transmitter. That RCV XFERRETRY signal is delivered to the transmit machine 58 indicating that packet N should be sent an additional time.

Figure 10:
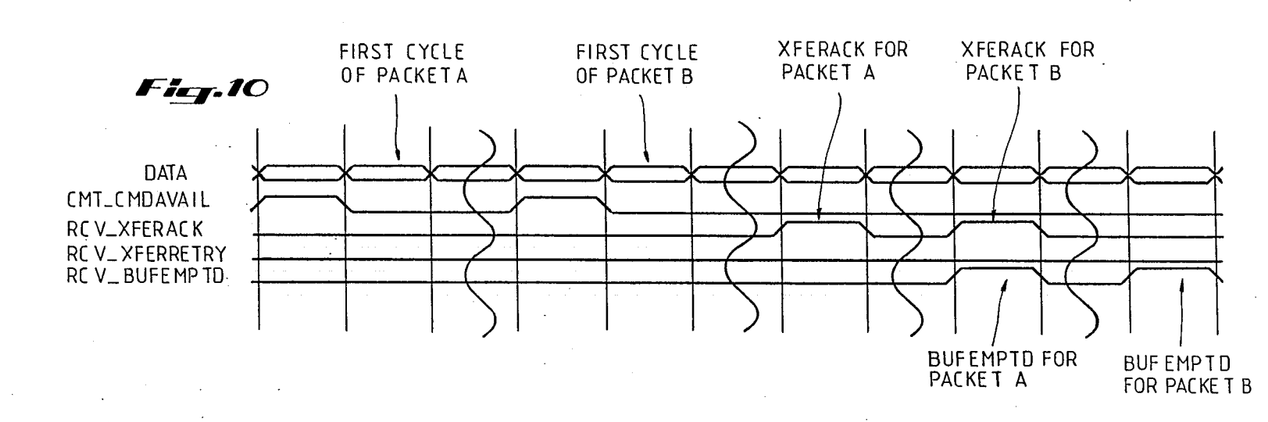
FIG. 10 is a timing diagram of the data and handshaking signals for two consecutively acknowledged data packet transfers.

Referring now to FIG. 10, the timing diagrams of two back to back packets are sent and both are acknowledged. The transmit machine 58 delivers the XMT CMDAVAIL signal and then selects the proper buffer in the transmit packet data buffer 50 to begin sending the packet of data. After the first packet of data has been sent to the receiver, the transmit machine 58 sends another XMT CMDAVAIL signal to the receiver and then selects the other buffer in the transmit packet data buffer 50 to begin sending that packet of data. Subsequently, the receive control machine 62 initiates RCV XFERACK signals for both packet A and packet B causing the packet transmit Queue 52 to retire both requests to send packets of data. Similarly, the receiver's specific logic will generate RCV BUFEMPTD signals for packets A and B to indicate to the receiver that both buffer locations in the receiver are free to receive additional packets of data.

Figure 11:
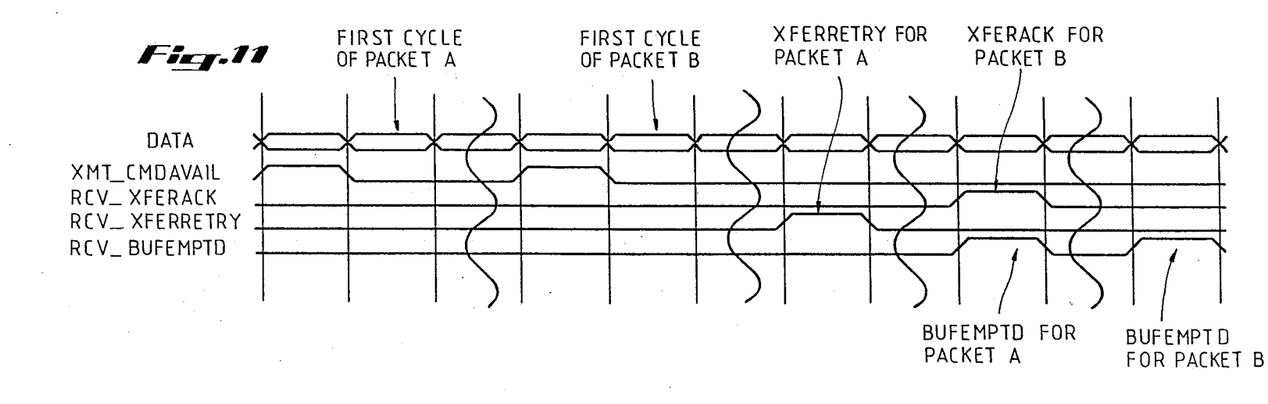
FIG. 11 is a timing diagram of the data and handshaking signals for two consecutive data packet transfers, where the first is acknowledged and the second is not.

Referring now to FIG. 11, the timing diagrams of two back to back packets are sent, the first is retried, and the second is acknowledge. Like the timing diagrams of FIG. 10, a XMT CMDAVAIL signal is delivered by the transmit machine 58 followed immediately by the packet of data for both of the selected packets A and B. Thereafter, the first handshaking signal returned by the receiver is the RCV XFERRETRY signal indicating that the first packet A has not been successfully received and should be retried. The second handshaking signal delivered by the receiver is, however, a RCV XFERACK signal indicating that packet B has been successfully received. Thus, the request to send packet B is removed from the packet transmit Queue 52 and the transmit machine 58 initiates a second transmission attempt for packet A. RCV BUFMEPTD signals are also returned from the receiver for both packet A and packet B thereby decrementing the counter 56 to indicate two additional buffer locations are available in the receiver.

We claim:

1. An interface for transferring data packets between a system control unit and an input/output unit, comprising:
   transmitting means for sequentially transmitting said data packets between said system control unit and said input/output unit; and
   receiving means for sequentially receiving said data packets transmitted between said system control unit and said input/output unit;
   said transmitting means including:
   packet transmit queue means for temporarily storing requests to transmit selected ones of said data packets;
   transmit buffer means for storing a plurality of said data packets and transmitting the selected ones of said data packets and corresponding parity signals indicating the parity of the selected data packets; and
   means for transmitting respective command available signals to signal the transmission of said selected data packets;
   said receiving means including:
   receive buffer means for responding to said command available signals by allocating storage space for said selected data packets, and sequentially receiving and storing said selected data packets;
   means for controllably unloading said selected data packets from said receive buffer means;
   means for returning respective buffer emptied signals to said transmitting means in response to said selected data packets being unloaded from said receive buffer means;
   means for receiving the parity signals and comparing the respective parity signals to the parity of the corresponding data packets received by the receiving means;

means for returning respective acknowledge signals to the transmitting means in response to the respective parity signals being consistent with the parity of corresponding data packets received by the receiving means; and means for returning respective retry signals to said transmitting means in response to the respective parity signals being inconsistent with the parity of corresponding data packets received by the receiving means; and said transmitting means further including:

means for receiving the returned buffer emptied signals, and in response to the returned buffer emptied signals calculating the number of data packets stored in said receive buffer means;

means for preventing said transmitting means from transmitting additional data packets in response to said calculated number being of a preselected magnitude;

means for receiving said retry signals and restarting the transfer of the data packets corresponding to said retry signals; and means for receiving said acknowledge signals and retiring the data packets corresponding to said acknowledge signals, wherein said transmitting means and said receiving means are interconnected and separated by a multi-line bus, and said transmitting means and said receiving means each include a separate control means for controlling the transferring of the data packets across the multi-line bus by handshaking of the signals across said multi-line bus without the use of a central control.

2. The interface as claimed in claim 1, wherein said receive buffer means includes an addressable data buffer, and wherein said receiving means includes a counter that addresses said addressable data buffer and counts in response to receiving said command available signals.

3. The interface as claimed in claim 2, wherein said means for calculating the number of data packets in said receive buffer means increments the calculated number in response to the command available signals.

4. The interface as claimed in claim 3, wherein said means for calculating the number of data packets stored in said receive buffer means decrements the calculated number in response to the buffer emptied signals.

5. An interface for transferring data packets between a system control unit and an input/output unit, comprising:

transmitting means for sequentially transmitting said data packets between said system control unit and said input/output unit; and receiving means for sequentially receiving said data packets transmitted between said system control unit and said input/output unit;

said transmitting means including:

means for transmitting corresponding parity signals indicating the parity of said data packets; and means for transmitting respective command available signals to signal the transmission of said data packets;

said receiving means including:

receive buffer means for responding to said command available signals by allocating storage space for said data packets, and sequentially receiving and storing said data packets;

means for controllably unloading said data packets from said receive buffer means;

means for returning respective buffer emptied signals to said transmitting means in response to said data packets being unloaded from said receive buffer means;

means for receiving the parity signals and comparing the respective parity signals to the parity of the corresponding data packets received by the receiving means;

means for returning respective acknowledge signals to the transmitting means in response to the respective parity signals being consistent with the parity of corresponding data packets received by the receiving means; and means for returning respective retry signals to said transmitting means in response to the respective parity signals being inconsistent with the parity of corresponding data packets received by the receiving means; and said transmitting means further including:

means for receiving the returned buffer emptied signals, and in response to the returned buffer emptied signals, and in response to the returned buffer emptied signals calculating the number of data packets stored in said receive buffer means;

means for preventing said transmitting means from transmitting additional data packets in response to said calculated number being of a preselected magnitude;

means for receiving said retry signals and restarting the transfer of the data packets corresponding to said retry signals; and means for receiving said acknowledge signals and retiring the request and data packets corresponding to said acknowledge signals;

wherein said transmitting means further includes means for generating a first periodic clock signal to synchronize the transmission of said data packets, said parity signals and said command available signals by said transmitting means, and means for transmitting said first clock signal to said receiving means to enable said receiving means to receive the transmitted data packets, said parity signals and said command available signals;

said transmitting means and receiving means are linked by a first signal path for the transmission of said first periodic clock signal, a second signal path for the transmission of said data packets from said transmitting means to said receiving means, a third signal path for the transmission of said parity signals, and a fourth signal path for the transmission of said command available signals; and said receiving means includes means for generating a second periodic clock signal, asynchronous with said first periodic clock signal, to synchronize the returning of said buffer emptied signals, said acknowledge signals and said retry signals from the receiving means to the transmitting means, and means for returning said second clock signal to said transmitting means to enable the transmitting means to receive said buffer emptied signals, said acknowledge signals and said retry signals; and said transmitting means and said receiving means are linked by a fifth signal path for the returning of said second periodic clock signal from the receiving means to the transmitting means, a sixth signal path for the returning of said buffer emptied signals from the receiving means to the transmitting means, a seventh signal path for the returning of said acknowledge signals, and an eighth signal path for the returning of said retry signals.

6. The interface as claimed in claim 5, wherein said receive buffer means includes an addressable data buffer, and wherein said receiving means includes a counter that addresses said addressable data buffer and counts in response to receiving said command available signals.

7. The interface as claimed in claim 6, wherein said means for calculating the number of data packets stored in said receive buffer means increments the calculated number in response to the command available signals.

8. The interface as claimed in claim 7, wherein said means for calculating the number of data packets stored in said receive buffer means decrements the calculated number in response to the buffer emptied signals.

9. An interface for transferring data packets between a system control unit and an input/output unit, comprising:

transmitting means for sequentially transmitting said data packets between said system control unit and said input/output unit; and receiving means for sequentially receiving said data packets transmitted between said system control unit and said input/output unit;

said transmitting means including:

packet transmit queue means for temporarily storing requests to transmit selected ones of said data packets;

transmit buffer means for storing a plurality of said data packets and transmitting the selected ones of said data packets and corresponding parity signals indicating the parity of the selected data packets; and means for transmitting respective command available signals to signal the transmission of said selected data packets;

said receiving means including:

receive buffer means for responding to said command available signals by allocating storage space for said selected data packets, and sequentially receiving and storing said selected data packets;

means for controllably unloading said selected data packets from said receive buffer means;

means for returning respective buffer emptied signals to said transmitting means in response to said selected data packets being unloaded from said receive buffer means;

means for receiving the parity signals and comparing the respective parity signals to the parity of the corresponding data packets received by the receiving means;

means for returning respective acknowledge signals to the transmitting means in response to the respective parity signals being consistent with the parity of corresponding data packets received by the receiving means; and means for returning respective retry signals to said transmitting means in response to the respective parity signals being inconsistent with the parity of corresponding data packets received by the receiving means; and said transmitting means further including:

means for receiving the returned buffer emptied signals, and in response to the returned buffer emptied signals calculating the number of data packets stored in said receive buffer means;

means for preventing said transmitting means from transmitting additional data packets in response to said calculated number being of a preselected magnitude;

means for receiving said retry signals and restarting the transfer of the data packets corresponding to said retry signals; and means for receiving said acknowledge signals and retiring the data packets corresponding to said acknowledge signals;

wherein said transmitting means further includes means for generating a first periodic clock signal to synchronize the transmission of said data packets, said parity signals and said command available signals by said transmitting means, and means for transmitting said first clock signal to said receiving means to enable said receiving means to receive the transmitted data packets, said parity signals and said command available signals;

said transmitting means and receiving means are linked by a first signal path for the transmission of said first periodic clock signal, a second signal path for the transmission of said data packets from said transmitting means to said receiving means, a third signal path for the transmission of said parity signals, and a fourth signal path for the transmission of said command available signals; and said receiving means includes means for generating a second periodic clock signal, asynchronous with said first periodic clock signal, to synchronize the returning of said buffer emptied signals, said acknowledge signals and said retry signals from the receiving means to the transmitting means, and means for returning said second clock signal to said transmitting means to enable the transmitting means to receive said buffer emptied signals, said acknowledge signals and said retry signals; and said transmitting means and said receiving means are linked by a fifth signal path for the returning of said second periodic clock signal from the receiving means to the transmitting means, a sixth signal path for the returning of said buffer emptied signals from the receiving means to the transmitting means, a seventh signal path for the returning of said acknowledge signals, and an eighth signal path for the returning of said retry signals.

10. The interface as claimed in claim 9, wherein said receive buffer means includes an addressable data buffer, and wherein said receiving means includes a counter that addresses said addressable data buffer and counts in response to receiving said command available signals.

11. The interface as claimed in claim 10, wherein said means for calculating the number of data packets stored in said receive buffer means increments the calculated number in response to the command available signals.

12. The interface as claimed in claim 11, wherein said means for calculating the number of data packets stored in said receive buffer means decrements the calculated number in response to the buffer emptied signals.

13. A method for transferring data packets across a multi-line bus in a computer system, said method comprising the steps of:

storing data packets in a transmitting buffer;

storing in a transmit packet queue requests to send selected data packets stored in the transmitting buffer;

sequentially transmitting the selected data packets from the transmitting buffer across said multi-line bus along with corresponding parity signals indicating the parity of the selected data packets;

transmitting respective command available signals across said multi-line bus to signal the transmission of said selected data packets;

sequentially receiving the data packets having been transmitted across said multi-line bus and signalled by the respective command available signals, and storing a plurality of the received data packets in a receiving buffer;

returning buffer emptied signals across said multi-line bus in response to the unloading of the data packets from the receiving buffer;

receiving the parity signals and comparing the respective parity signals to the parity of the corresponding received data packets;

returning respective acknowledge signals across said multi-line bus in response to the respective parity signals being consistent with the parity of corresponding received data packets;

returning respective retry signals across said multi-line bus in response to the respective parity signals being inconsistent with the parity of corresponding received data packets;

receiving the returned buffer emptied signals, and in response to the returned buffer emptied signals, calculating the number of data packets stored in the receiving buffer;

selectively inhibiting the transmitting of additional data packets across said multi-line bus in response to said calculated number being of a preselected magnitude;

receiving the returned retry signals and restarting the transmission of the data packets corresponding to the retry signals; and receiving the acknowledge signals and retiring the requests and data packets corresponding to the acknowledge signals, wherein the transfer of the data packets across the multi-line bus is controlled by handshaking of the signals across the multi-line bus between a transmitter control means and a receiver control means interconnected and separated by said multi-line bus so that the transfer of the data packets across the multi-line bus is controlled by the handshaking of the signals across said multi-line bus without the use of a central control.

14. The method as claimed in claim 13 wherein said receiving buffer is an addressable data buffer and wherein storage is allocated by changing an address which addresses said data buffer.

15. The method as claimed in claim 13, wherein each command available signal is transmitted during a respective cycle of a periodic clock prior to the transmission of a corresponding data packet.

16. The method as claimed in claim 13, further comprising the steps of:

generating a first periodic clock signal; synchronizing to said first period clock signal the transmitting of said data packets, the transmitting of said parity signals, and the transmitting of said command available signals; and transmitting said first periodic clock signal to said receiving means to enable said receiving means to receive the transmitted data packets, said parity signals and said command available signals; and generating a second periodic clock signal, asynchronous with said first periodic clock signal; synchronizing to said second periodic clock signal the returning of said buffer emptied signals, said acknowledge signals and said retry signals; and returning said second periodic clock signal along with said buffer emptied signals, said acknowledge signals and said retry signals to enable the reception of said buffer emptied signals, said acknowledge signals and said retry signals.

* * * * *